United States Patent
Mine et al.

[11] Patent Number: 5,848,552
[45] Date of Patent: Dec. 15, 1998

[54] YOKE OF PLANETARY GEAR-TYPE STARTER MANUFACTURING APPARATUS THEREFOR MANUFACTURING METHOD THEREOF

[75] Inventors: Hiroshi Mine; Akira Morishita; Yoshihiro Morimoto, all of Tokyo, Japan

[73] Assignee: Mitsubishi Denki Kabushiki Kaisha, Tokyo, Japan

[21] Appl. No.: 795,306

[22] Filed: Feb. 4, 1997

[30] Foreign Application Priority Data

Jul. 1, 1996 [JP] Japan ................................. 8-171412

[51] Int. Cl.⁶ ....................................................... H02K 7/00
[52] U.S. Cl. ................................................. 74/7 E; 74/7 A
[58] Field of Search ............................. 74/7 E, 7 A, 7 R, 74/6

[56] References Cited

U.S. PATENT DOCUMENTS

| | | |
|---|---|---|
| 4,488,073 | 12/1984 | Morishita . |
| 4,507,978 | 4/1985 | Tanaka et al. ............................. 74/7 E |
| 4,519,261 | 5/1985 | Hamano ..................................... 74/7 E |
| 4,520,285 | 5/1985 | Isozumi et al. . |
| 4,587,861 | 5/1986 | Morishita ................................... 74/7 E |
| 4,590,811 | 5/1986 | Kasubuchi ................................. 74/7 E |
| 4,671,125 | 6/1987 | Yabunaka et al. . |
| 4,680,979 | 7/1987 | Morishita et al. ........................ 74/7 E |
| 4,848,172 | 7/1989 | Morishita .................................. 74/7 E |

FOREIGN PATENT DOCUMENTS

| | | |
|---|---|---|
| 19534788 | 12/1996 | Germany . |
| 63-104684 | 7/1988 | Japan . |

*Primary Examiner*—Charles A. Marmor
*Assistant Examiner*—David Fenstermacher
*Attorney, Agent, or Firm*—Sughrue, Mion, Zinn, Macpeak & Seas, PLLC

[57] ABSTRACT

In a cylindrical yoke 1 of a planetary gear-type starter which acts as the magnetic field of the motor of a planetary gear-type starter for reducing the rotation of a motor output shaft 31 and transmitting the reduction rotation to a starter output shaft 21 so that an inner peripheral gear portion is improved in precision by suppressing a material remaining in the yoke 1 and gear noise is reduced in operation, the yoke 1 comprises an opening formed at the bottom portion of the yoke for journaling the starter output shaft of the planetary gear-type starter, an inner peripheral gear portion 11 formed in the vicinity of the bottom portion 12 of the yoke, and an annular thick portion 18 formed between the inner peripheral gear portion and the bottom portion on the inner peripheral side thereof, wherein the yoke 1 incorporates the flange 2 of the starter output shaft and planetary gears 4 which are rotatably mounted to the flange as well as engaged with the outer peripheral gear portion 32 of the motor output shaft and the inner peripheral gear portion. There are also provided a manufacturing apparatus and a manufacturing method of the yoke.

3 Claims, 5 Drawing Sheets

YOKE OF PLANETARY GEAR-TYPE STARTER MANUFACTURING APPARATUS THEREFOR MANUFACTURING METHOD THEREOF

BACKGROUND OF THE INVENTION

1. Field of the Invention

The present invention relates to a yoke of a planetary gear-type starter incorporating a planetary gear reducer used in, for example, an automobile engine as well as a manufacturing apparatus therefor and a manufacturing method thereof, and more specifically, to a yoke of a planetary gear-type starter in which an inner peripheral gear portion formed in the yoke is greatly improved in precision, and in which the gear noise made when the starter is operated is reduced; as well as a manufacturing apparatus therefor and a manufacturing method thereof.

2. Description of the Related Art

Conventionally, there is used a planetary gear-type starter incorporating a planetary gear reducer which includes planetary gears as a starter for driving, for example, a crank shaft when an automobile engine is started.

FIG. 3 is a side elevational view, partly in cross section, of a planetary gear-type starter including a conventional yoke arranged integrally with an inner peripheral gear portion.

In FIG. 3, the cylindrical yoke 1 acting as the magnetic field of the motor of the planetary gear-type starter includes a ring gear or an annular inner peripheral gear portion 11 formed at an inner peripheral side adjacent to a side wall or a bottom portion 12 composed of a thick portion, a bearing 13 engaged in the opening 15 of the bottom portion 12 at the center thereof and a thin portion 14 formed at an opening side confronting the bottom portion 12.

A flange 2 journaled by the bearing 13 has a plurality of pins 22 standing on the end surface extending in the yoke 1. The respective pins 22 are concentrically disposed to form an arc shape with respect to the center axis of rotation of the flange 2 and each of the pins 22 has a planetary gear 4 rotatably disposed thereto.

The flange 2 constitutes a reducer on the end surface side thereof in cooperation with the inner peripheral gear portion 11 and planetary gears 4. The other end of the flange 2 is fixed to the starter output shaft 21 of the starter so as to transmit the rotational output of the motor to the starter output shaft 21 through the planetary gear reducer.

An annular projecting portion projecting in the axial direction of the starter output shaft 21 is formed to the end surface of the opening 15 of the bottom portion 12 so as to secure the length in the axial direction so that the projecting portion holds the bearing 13 by being engaged therewith. With this arrangement, even if the bottom portion 12 is formed to a relatively thin thickness, it is permitted to be engaged with the bearing 13, so that reduction in weight is realized by suppressing the wall thickness of the bottom portion 12.

The extreme end of the starter output shaft 21 is journaled by a bracket 5 covering a front portion and an overrunning clutch 24 and a pinion gear 25 are disposed at an intermediate portion of the starter output shaft 21 so as to be movable in the axial direction. The bracket 5 is fixed to the outer peripheral end surface of the bottom portion 12 of the yoke 1.

When the starter is operated, the overrunning clutch 24 and the pinion gear 25 move in the direction of the arrow while rotating integrally with the starter output shaft 21, so that they drive a starting object (for example, the crank shaft of an automobile engine) through the gear portion of the outer peripheral side of the pinion gear 25.

The motor which is driven at the time of start includes a rotor or an armature 3 coupled with a motor output shaft 31, a permanent magnet 33 acting as a magnetic field device and the yoke 1. The permanent magnet 33 is magnetized in a radial direction and generates flux in the peripheral direction in the yoke 1 acting as a magnetic path forming unit. The motor output shaft 31 coupled with the armature 3 is accommodated in the thin portion 14 of the cylindrical yoke 1. The extreme end of the motor output shaft 31 extends to the vicinity of the bearing 13 in the yoke 1.

The motor output shaft 31 is coaxially accommodated in the flange 2 of the starter output shaft 21 and journaled by the bearing 23 in the flange 2.

The plurality of planetary gears 4 rotatably mounted to the respective pins 22 on the flange 2 are engaged with the sun gear or the outer peripheral gear portion 32 on the motor output shaft 31 and the inner peripheral gear portion 11 of the yoke 1, respectively.

The inner peripheral gear portion 11 of the yoke 1 constitutes the planetary gear reducer in association with the planetary gears 4 on the flange 2 and the motor output shaft 31 and is accommodated on the bottom portion 12 side of the yoke 1. When the starter is operated, the planetary gear reducer reduces the rotation of the motor output shaft 31 through the planetary gears 4 and transmits the reduced rotation to the starting object (crank shaft) through the starter output shaft 21 and the pinion gear 25.

Although not shown, a switching device 6 which is mounted to the bracket 5 and disposed on the yoke 1 incorporates a switching circuit for supplying electric power to the motor in association with a key switch and the like when the starter is operated and a plunger for driving the overrunning clutch 24.

A lever 7, which is rotatably mounted to a rotatable shaft 71 and has one end engaged with the plunger in the switching device 6 and the other end engaged with the overrunning clutch 24, is rotated counterclockwise about the rotatable shaft 71 when the plunger is driven so as to move the overrunning clutch 24 and the pinion gear 25 on the starter output shaft 21 in the direction of the arrow.

Next, operation of the planetary gear-type starter using the conventional yoke 1 shown in FIG. 3 will be described.

First, before the starter is operated, the lever 7 is located in the state shown in FIG. 3, the overrunning clutch 24 is not moved and the pinion gear 25 is not engaged with the crank shaft.

When the starter is operated by turning on the key switch, the armature 3 of the motor which is energized by the electric power supplied from the switching device 6 is rotated by receiving the urging force of the permanent magnet 33 to thereby drive the motor output shaft 31 arranged integrally with the armature 3 in rotation. In addition, the lever 7 which is driven by the plunger in the switching device 6 rotates counterclockwise about the rotatable shaft 71 so as to move the overrunning clutch 24 in the direction of the arrow and causes the pinion gear 25 to be engaged with the crank shaft.

At this time, the rotational torque output from the armature 3 of the motor is transmitted to the planetary gears 4 from the outer peripheral gear portion 32 of the motor output shaft 31. With this operation, the planetary gears 4 turns between the outer peripheral gear portion 32 of the motor output shaft 31 and the inner peripheral gear portion 11 of the yoke 1 while rotating about the pins 22.

The flange 2 to which the planetary gears 4 are rotatably mounted is rotated by the turn of the planetary gears 4 at a rotational speed which is reduced with respect to the rotational speed of the motor output shaft 31 and the reduced rotational output is transmitted to the starter output shaft 21.

The starter output shaft 21 rotates the crank shaft through the overrunning clutch 24 and the pinion gear 25 at the reduced rotational speed.

A manufacturing apparatus and a manufacturing method of the yoke 1 will be described with reference to the side cross sectional views of FIG. 4 and FIG. 5. FIG. 4 shows a case made from a metal material in which a thin portion 14 is previously, which is used as the material of the yoke 1; and FIG. 5 shows a case made from a metal material, having a thick bottom portion 12, which is used as the material of the yoke 1, respectively.

In the respective drawings, an opening 15 with which the bearing 13 (see FIG. 3) is engaged is previously formed in the bottom portion 12 of the yoke 1.

Further, the state shown here is just before the metal material of the yoke 1 clamped between a metal mold 8 and a die 9 is worked (the inner peripheral gear portion 11 is formed).

The metal mold 8 which is inserted by a drive means 80 into the yoke 1 in the direction of an arrow includes a projecting tip portion 81 which is aligned with the opening 15 of the yoke 1 and inserted thereinto, a toothed portion 82 formed to the outer periphery of the extreme end of the metal mold 8 so as to correspond to the inner peripheral gear portion 11 and a diametrically enlarged portion 85 formed rearward of the toothed portion 82 and corresponding to the inside diameter of the thin portion 14.

Further, the die 9 disposed coaxially with the metal mold 8 in confrontation therewith has a cup-shape and forms the outer peripheral shape of the yoke 1 when the metal mold 8 is inserted. Although the die 9 is shown to have to a thin thickness here for convenience, actually it has a wall thickness which can sufficiently endure the press force of the metal mold 8.

When the yoke 1 is molded, the metal material is inserted into the die 9 and then the metal mold 8 is inserted by the drive means 80 such as a hydraulic cylinder.

When the yoke material having the shape shown in FIG. 4 is used, the metal mold 8 is inserted into the yoke 1 while the diametrically enlarged portion 85 is guided by the inside diameter of the thin portion 14. The metal mold 8 is inserted up to a predetermined position while the projecting tip portion 81 is inserted into the opening 15 to guide it and the toothed portion 82 is formed to the inner peripheral gear portion 11 in the yoke 1.

In this case, the yoke material located at the position corresponding to the inner peripheral gear portion 11 is previously formed to a thickness larger than the thin portion 14 and has an inside diameter smaller than the outside diameter of the toothed portion 82.

Therefore, the inner peripheral gear portion 11 and the thin portion 14 are formed by the insertion of the toothed portion 82 of the metal mold 8 in the state that the thick portion of the yoke material flows to the diametrically enlarged portion 85 located in the rear section of the metal mold 8.

Likewise, when the yoke material having the shape shown in FIG. 5 is used, the inner peripheral gear portion 11 and the thin portion 14 are formed in the state that the yoke material flows to the diametrically enlarged portion 85 side when the metal mold 8 is inserted. In the case of the yoke material of FIG. 5, the amount of the material flowing rearward is larger than that of the yoke material of FIG. 4, thus the pressurizing force of the metal mold 8 for molding the thin portion 14 is increased.

At the time, since the toothed portion 82 is formed up to the extreme end of the metal mold 8, the inner peripheral gear portion 11 is formed up to the vicinity of the bottom portion 12. In addition, the outer peripheral shape of the yoke 1 is formed by tracing the inside diametrical shape of the die 9 at the same time.

The thus formed inner peripheral gear portion 11 has a degree of working (corresponding to the reduction ratio of a cross section) which reaches about 70% or more particularly when the yoke material of FIG. 5 is used.

Therefore, the outside diameter of the extreme end of the toothed portion 82 is usually formed larger than the outside diameter of the rear part of the toothed portion 82 to prevent the seizure of the toothed portion 82 to the material of the inner peripheral gear portion 11, and to thereby form an escape portion (not shown).

However, when the above escape portion is formed to the toothed portion 82, the yoke material is difficult to flow to the rear section of the toothed portion 82, thus it is difficult to form the inner peripheral gear portion 11 with a pinpoint accuracy.

In addition, since the yoke material is liable to remain forward of the metal mold 8, the remaining material pushed forward by the metal mold 8 forms a bulge portion 16 as shown by a broken line in the inside diameter direction of the yoke 1 (see FIG. 4). There is a possibility that the bulge portion 16 is further compressed between the extreme end of the metal mold 8 and the bottom portion 12 and remains in an easily collapsible state.

When the yoke material partially remains in the unstable state as described above, it collapses during the operation of the starter, enters a gear portion in the vicinity thereof and makes the operation of the starter impossible.

Further, since all the thick portion of the yoke 1 is worked and the inner peripheral gear portion 11 is formed to the vicinity of the bottom portion 12, the mechanical rigidity of the yoke 1 is lowered and noise is increased during speed reducing operation.

As described above, according to the conventional yoke of the planetary gear-type starter as well as a manufacturing apparatus therefor and a manufacturing method thereof, since the inner peripheral gear portion 11 is formed up to the bottom portion 12 in the yoke 1, there is a problem that the flow of the material of the yoke 1 to the inner peripheral gear portion 11 is prevented by the bulge portion 16 made when the inner peripheral gear portion 11 is formed and the accuracy of the inner peripheral gear portion 11 of the yoke 1 is deteriorated.

There is also a problem that when the bulge portion 16 remains in an unstable state after the completion of the yoke 1, it falls to the inner peripheral gear portion 11 and the like while they are used and the function of the yoke 1 is damaged by it.

Further, there is a problem that since the inner peripheral gear portion 11 is formed up to the bottom portion 12 in the yoke 1, the mechanical rigidity of the yoke 1 is lowered and unpleasant feeling is given to the user by the increase of gear noise in operation.

An object of the present invention made to solve the above problems is to provide a yoke of a planetary gear-type starter as well as a manufacturing apparatus therefor and a manufacturing method thereof by which an inner peripheral gear portion is greatly improved in precision through the suppression of a material remaining in the yoke as well as gear noise is reduced during operation.

SUMMARY OF THE INVENTION

A cylindrical yoke according to one aspect of the present invention for a planetary gear type starter including an electric motor with an armature and a rotary shaft, and a starter output shaft having a flange portion formed at its one end and operatively connected with the rotary shaft through a planetary gear mechanism having a sun gear, a plurality of planetary gears and a ring gear, comprises a hollow cylindrical body acting as a field magnet of the electric motor, a side wall portion formed integrally with the hollow cylindrical body and having an opening defined therein at its center in a concentric relation with respect to the hollow cylindrical body for rotatably supporting the starter output shaft, an inner peripheral gear portion formed on an inner periphery of the hollow cylindrical body, the inner peripheral gear portion acting as the ring gear and being adapted to be in meshing engagement with the planetary gears; and an enlarged-thickness annular portion formed integrally with the hollow cylindrical body between the inner peripheral gear portion and the side wall portion, and wherein the armature of the electric motor and the planetary gears provided on the flange portion of the starter output shaft are accommodated in the hollow cylindrical body.

In one form of the invention, the cylindrical yoke is arranged such that the enlarged-thickness annular portion has a width greater than that of the flange portion.

An apparatus for manufacturing a cylindrical yoke using a cylindrical yoke-forming member according to another aspect of the present invention, comprises a cylindrical die having a closed end and an open end from which the cylindrical yoke-forming member is to be inserted into the cylindrical die, a mold to be fitted into the cylindrical die for sliding movement relative thereto, and drive means for driving the mold to move relative to the cylindrical die in an axial direction thereof. The mold comprises a cylindrical portion, a toothed portion formed integrally with the cylindrical portion at one end thereof and having a diameter large than the cylindrical portion, and a diametrically enlarged portion formed integrally with the toothed portion, the diametrically enlarged portion being adapted to be slidably fitted into the cylindrical yoke-forming member in the cylindrical die, whereby the mold is driven by the drive means to move toward the closed end of the cylindrical die in an axial direction thereof to thereby press form the yoke-forming member into a cylindrical yoke which comprises a hollow cylindrical body, a side wall portion formed integrally with the hollow cylindrical body, an inner peripheral gear portion formed on an inner periphery of the hollow cylindrical body, and an enlarged-thickness annular portion formed integrally with the hollow cylindrical body at a location between the inner peripheral gear portion and the side wall portion.

A method of manufacturing a cylindrical yoke according to a further aspect of the present invention comprises the steps of preparing a cylindrical yoke-forming member, inserting the cylindrical yoke-forming member into a cylindrical die having a closed end with one end of the cylindrical yoke-forming member being in contact with the closed end thereof, preparing a mold which has a cylindrical portion, a toothed portion integrally formed with the cylindrical portion, and a diametrically enlarged portion integrally formed with the toothed portion, inserting the mold into the cylindrical yoke-forming member, and moving the mold toward the closed end of the cylindrical die in an axial direction thereof to thereby press form the yoke-forming member into a cylindrical yoke which comprises a hollow cylindrical body, a side wall portion formed integrally with the hollow cylindrical body, an inner peripheral gear portion formed on an inner periphery of the hollow cylindrical body, and an enlarged-thickness annular portion formed integrally with the hollow cylindrical body at a location between the inner peripheral gear portion and the side wall portion.

DESCRIPTION OF THE PREFERRED EMBODIMENT

Embodiment 1

An embodiment 1 of the present invention will be described below with reference to the drawings.

Figure 1:
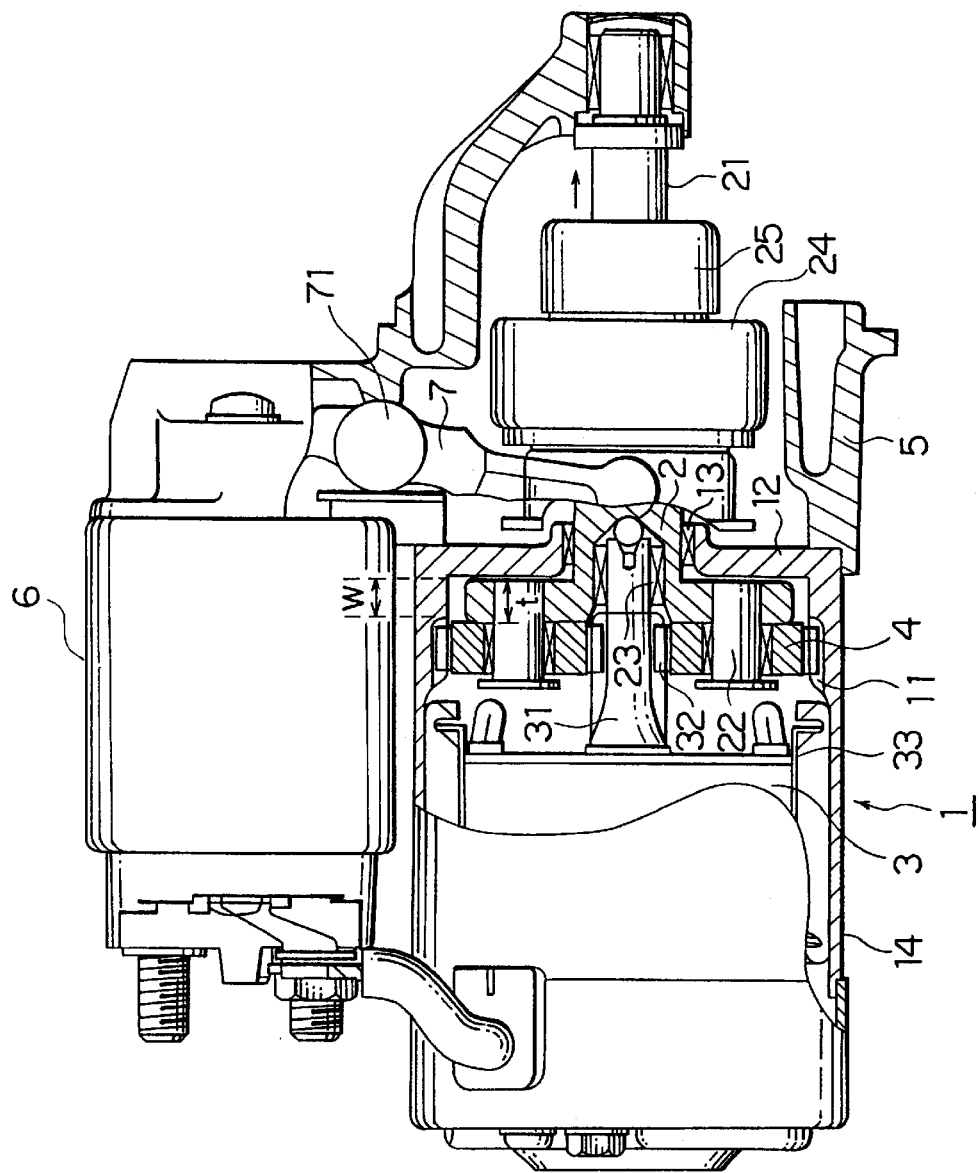
FIG. 1 is a side elevational view, partly in cross section, of a planetary gear-type starter using a yoke according to an embodiment 1 of the present invention.
Figure 3:
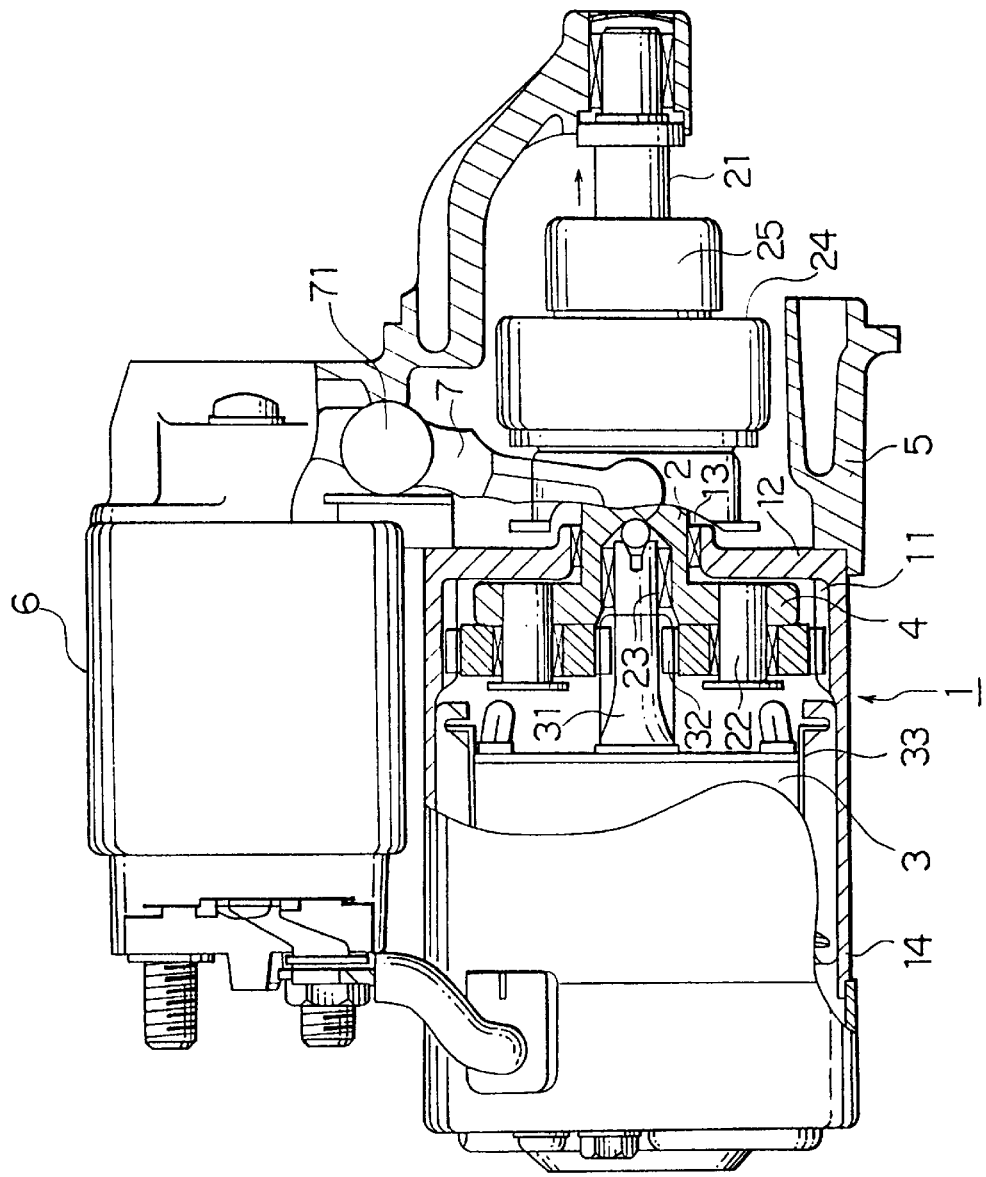
FIG. 3 is a side elevational view, partly in cross section, of a planetary gear-type starter using a conventional yoke.

FIG. 1 is a side elevational view, partly in cross section, of a planetary gear-type starter including a yoke 1 according to the embodiment 1 of the present invention, wherein the same components as those in the aforesaid prior art (see FIG. 3) are denoted by the same numerals as used in the above prior art and the description thereof is omitted.

In this case, the yoke 1 has an annular thick portion 18 where no gear is formed between an inner peripheral gear portion 11 and a bottom portion 12 on the inside thereof.

The width w of the annular thick portion 18 is set smaller than the thickness t of a flange 2 to secure the width of the inner peripheral gear portion 11 to be engaged with planetary gears 4.

Figure 2:
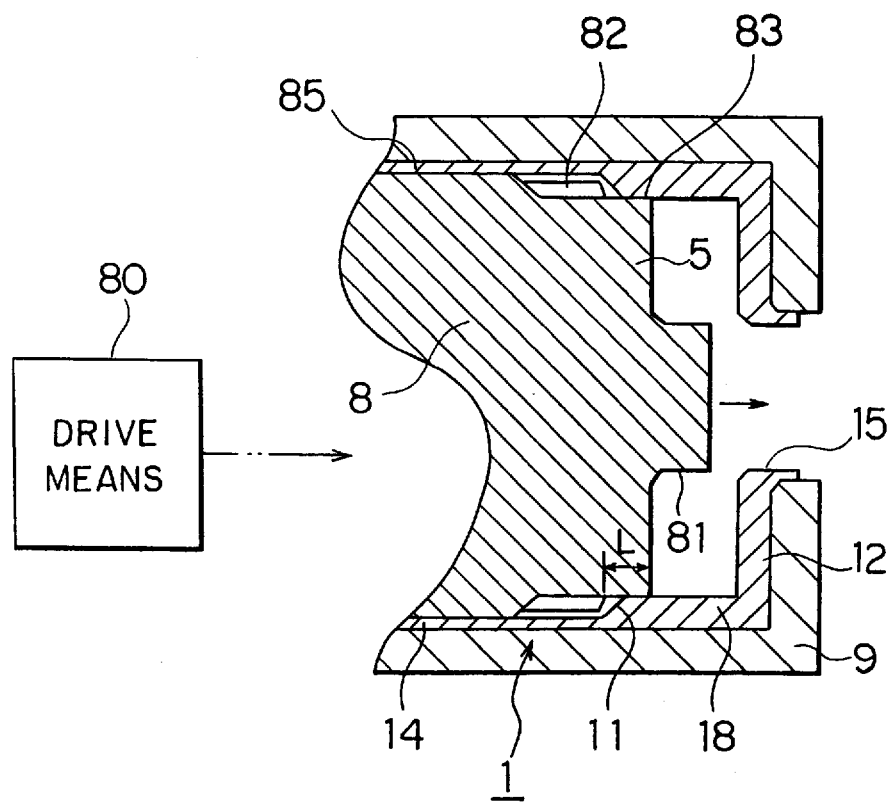
FIG. 2 is a cross sectional view showing a manufacturing apparatus of the yoke 1 according to the embodiment 1 of the present invention.
Figure 4:
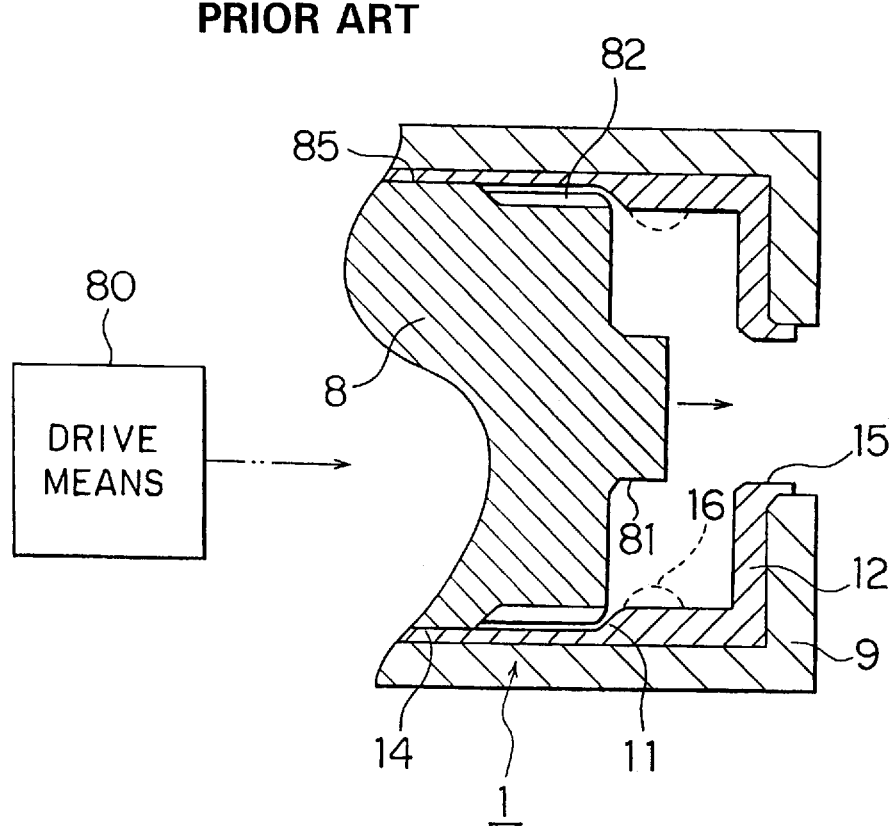
FIG. 4 is a cross sectional view showing a manufacturing apparatus of the conventional yoke.
Figure 5:
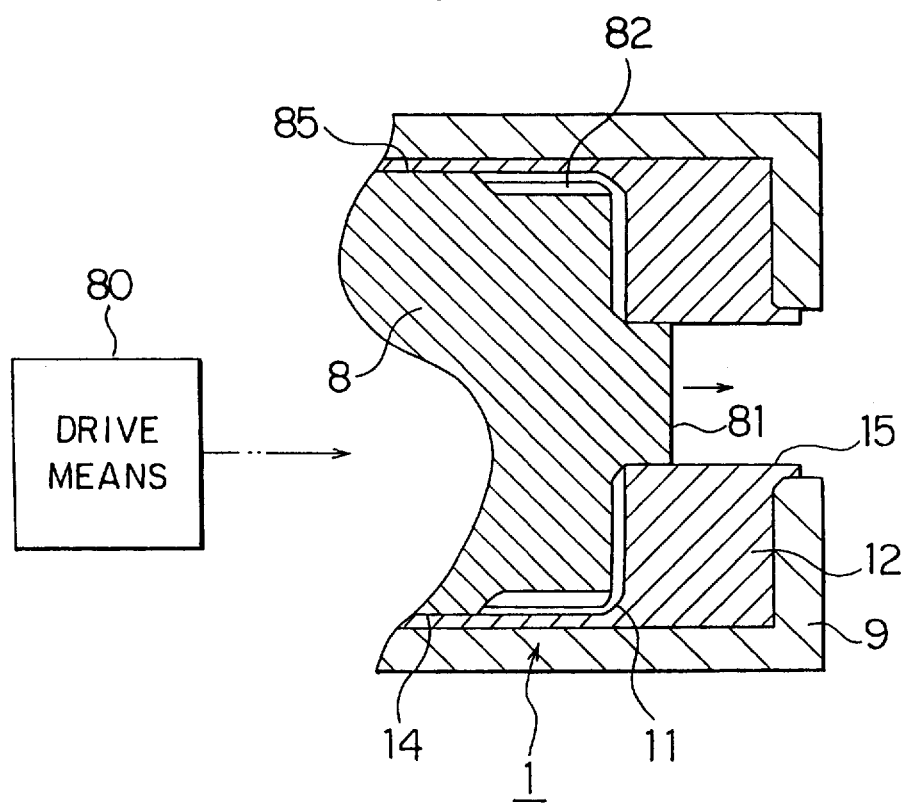
FIG. 5 is a cross sectional view showing another example of the manufacturing apparatus of the conventional yoke.

FIG. 2 is a cross sectional view showing a manufacturing apparatus and a manufacturing method of the yoke 1 according to the embodiment 1 of the present invention, wherein the same components as those in the above prior art (see FIG. 4) are denoted by the same numerals as used therein and the description thereof is omitted.

In this case, used is a yoke material to which a thick portion corresponding to the inner peripheral gear portion 11 and a cylindrical thin portion 14 are previously formed.

In FIG. 2, a cylindrical portion 83 of small diameter without a toothed portion is formed to the extreme end of the manufacturing apparatus of the yoke 1 or a metal mold 8. The cylindrical portion 83 has a length L corresponding to the width w of the annular thick portion 18 of the yoke 1 (see FIG. 1).

Further, a toothed portion 82 having a diameter larger than the cylindrical portion 83 is formed to the rear section of the cylindrical portion 83 of the metal mold 8.

In the embodiment 1 of the present invention, since rotational operation and speed reducing operation of the starter shown in FIG. 1 is the same as those of the aforesaid prior art, the description thereof is omitted.

Operation of the manufacturing apparatus of the yoke 1 according to the embodiment 1 of the present invention (manufacturing method of the yoke 1) will be described below with reference to FIG. 2.

First, the yoke material is inserted into a cup-shaped die 9 and the metal mold 8 is inserted by the drive means 80 to a predetermined position while a diametrically enlarged portion 85 is guided in the thin portion 14 likewise the above-mentioned.

At the time, a projecting tip portion 81 is inserted into an opening 15 and a toothed portion 82 is inserted into the thick portion of the yoke material using the opening 15 as a guide. With this operation, the material of the thick portion in the yoke 1 flows to a diametrically enlarged portion 85 located at the rear section of the metal mold 8 so as to form the inner peripheral gear portion 11.

Since the outside diameter of the cylindrical portion 83 formed to the extreme end of the metal mold 8 is set slightly larger than the inside diameter of the annular thick portion 18 in the yoke 1, the cylindrical portion 83 moves forward while causing the inner surface of the annular thick portion 18 to coincide with the outer peripheral shape of the cylindrical portion 83.

The toothed portion 82 located rearward of the cylindrical portion 83 forms the inner peripheral gear portion 11 having a necessary minimum width.

Therefore, the inner peripheral gear portion 11 is not formed at the vicinity of the bottom portion 12 and the annular thick portion 18 having the width w remains by being formed adjacent to the bottom portion 12.

Since the inner peripheral gear portion 11 is worked at a degree of working suppressed to about 20% at the time, no seize of the toothed portion 82 to the yoke material is caused, thus it is not necessary to form an escape portion of large diameter at the extreme end of the toothed portion 82.

When the metal mold 8 is inserted, since the cylindrical portion 83 forms the annular thick portion 18 and the toothed portion 82 forms the inner peripheral gear portion 11 rearward of the annular thick portion 18, the yoke material smoothly flows rearward without the occurrence of a bulge portion 16 (see FIG. 4), thus the inner peripheral gear portion 11 can be formed with a pinpoint accuracy. In addition, it can be prevented that an unstable material piece remains in the yoke 1 and falls to the gear portion.

The mechanical rigidity of the yoke 1 and the tooth surface of the inner peripheral gear portion 11 is increased and noise can be suppressed in speed reducing operation by the formation of the annular thick portion 18 in the yoke 1.

Further, since the width w of the annular thick portion 18 is set smaller than the thickness t of the flange 2, the planetary gears 4 do not interfere with the annular thick portion 18, thus the arrangement of the speed reduction mechanism is not damaged.

There is an advantage that a yoke of a planetary gear-type starter having an inner peripheral gear portion of improved precision can be obtained by suppressing the material remaining in the yoke and gear noise is lowered in operation.

There is an advantage that a yoke of a planetary gear-type starter can be obtained by which the function of a reducing mechanism is not damaged.

There is an advantage that the manufacturing apparatus of the yoke of the planetary gear-type starter having an inner peripheral gear portion of improved precision can be obtained by suppressing the material remaining in the yoke and gear noise is lowered in operation.

There is an advantage that a manufacturing method of a yoke of a planetary gear-type starter having an inner peripheral gear portion of improved precision can be obtained by suppressing the material remaining in the yoke and gear noise is lowered in operation.

What is claimed is:

1. A cylindrical yoke for a planetary gear type starter including an electric motor with an armature and a rotary shaft, and a starter output shaft having a flange portion formed at one end and operatively connected with the rotary shaft through a planetary gear mechanism having a sun gear, a plurality of planetary gears and a ring gear, said cylindrical yoke comprising:

a hollow cylindrical body acting as a field magnet of the electric motor;

a side wall portion formed integrally with said hollow cylindrical body and having an opening at a center of said side wall portion concentric with said hollow cylindrical body for rotatably supporting the starter output shaft;

an inner peripheral gear portion formed on an inner periphery of said hollow cylindrical body, said inner peripheral gear portion acting as the ring gear and being adapted to be in meshing engagement with the planetary gears; and an enlarged-thickness annular portion formed integrally with said hollow cylindrical body between said inner peripheral gear portion and said side wall portion;

wherein the armature of the electric motor and the planetary gears provided on the flange portion of the starter output shaft are accommodated in said hollow cylindrical body.

2. The cylindrical yoke according to claim 1, wherein said enlarged-thickness annular portion has a width smaller than that of the flange portion.

3. A cylindrical yoke for a planetary gear type starter including an electric motor with an armature and a rotary shaft, and a starter output shaft having a flange portion formed at one end and operatively connected with the rotary shaft through a planetary gear mechanism having a sun gear, a plurality of planetary gears and a ring gear, said cylindrical yoke comprising:

a hollow cylindrical body;

a side wall portion formed integrally with said hollow cylindrical body and having an opening at a center of said side wall portion concentric with said hollow cylindrical body for rotatably supporting the starter output shaft;

an inner peripheral gear portion formed on an inner periphery of said hollow cylindrical body, said inner peripheral gear portion acting as the ring gear and being adapted to be in meshing engagement with the planetary gears; and an enlarged-thickness annular portion formed integrally with said hollow cylindrical body between said inner peripheral gear portion and said side wall portion;

wherein the armature of the electric motor and the planetary gears provided on the flange portion of the starter output shaft are accommodated in said hollow cylindrical body.

* * * * *